United States Patent [19]
Palmer, II et al.

[11] Patent Number: 5,356,193
[45] Date of Patent: Oct. 18, 1994

[54] PROTECTIVE COVER FOR THE FRAME SURROUNDING THE FRONT WINDSHIELD OF A MOTOR VEHICLE

[76] Inventors: Britton W. Palmer, II, 2350 E. Vassar, Denver, Colo. 80210; Robert C. Terkhorn, 4418 S. Atchison Cir., Aurora, Colo. 80015

[21] Appl. No.: 104,770

[22] Filed: Aug. 12, 1993

[51] Int. Cl.⁵ .............................................. B62D 25/08
[52] U.S. Cl. ..................................... 296/136; 280/770
[58] Field of Search ................ 296/136; 150/166, 168; 160/370.2 A; 280/770

[56] References Cited

U.S. PATENT DOCUMENTS

| | | | |
|---|---|---|---|
| 1,316,834 | 9/1919 | Fahrney | 296/136 X |
| 1,472,651 | 10/1923 | Holling | 150/166 X |
| 1,559,458 | 10/1925 | Riziano | 150/166 |
| 2,048,461 | 7/1936 | Mosgoffian | 296/136 X |
| 4,376,546 | 3/1983 | Guccione et al. | 296/95.1 |
| 4,531,560 | 7/1985 | Balanky | 296/136 X |
| 4,734,312 | 3/1988 | Sugiyama | 296/136 X |
| 5,158,324 | 10/1992 | Flesher | 296/136 X |

FOREIGN PATENT DOCUMENTS 0314676  12/1989  Japan .................................... 296/136

*Primary Examiner*—Dennis H. Pedder
*Attorney, Agent, or Firm*—Robert H. Kelly

[57] ABSTRACT

A protective cover for the frame surrounding the front windshield of a motor vehicle which prevents the paint and metal of the auto body frame from being damaged by airborne debris. The protective cover is a single unit molded from a semi-rigid material and designed to conform to the natural shape of the frame surrounding the front windshield. The protective cover contains an area of no material at its center whereby a driver's vision is totally unobstructed while driving. Two main attachment mechanisms are located respectively on the right and left vertical portions of the protective cover. The attachment mechanisms are continuous extensions of the same semi-rigid material comprising the overall structure of the protective cover. The outer edges of the attachment mechanisms hook around the backside of the vertical frame post of the motor vehicle and create a sufficient pulling force as to secure the protective cover to the vehicle. A Hook and loop type fastening device is applied to the inside of the upper portion of the protective cover so as to securely adhere the upper portion to the motor vehicle. The protective cover is primarily designed for Jeep type open top vehicles, but is not limited to this use and is applicable to all other motor vehicles.

12 Claims, 4 Drawing Sheets

PROTECTIVE COVER FOR THE FRAME SURROUNDING THE FRONT WINDSHIELD OF A MOTOR VEHICLE

BACKGROUND

1. Field of Invention

This invention relates to motor vehicles, specifically to a protective cover for the frame surrounding the front windshield of a motor vehicle.

2. Discussion of Prior Art

Due to the basic design of all motor vehicles, certain areas of a motor vehicle such as the front hood, front fenders, front grill, front windshield, headlights, lower front air spoiler, and the frame surrounding the front windshield are susceptible to damage caused by airborne sand, insects, rocks, gravel, and other debris which are encountered while driving on highways and roads.

The damage appears in the form of chips in the paint and/or small dents in the body of the motor vehicle. Such damage can eventually lead to the development of rust on the motor vehicle body and can detract from the visual appearance of the motor vehicle.

In the past, inventors have created several types of protective covers and deflector shields for the front end of a motor vehicle. Some of these protective covers have incorporated air deflection devices which, in theory, use air currents to deflect debris away from the front of a motor vehicle. In actuality, such air current deflection devices are not capable of deflecting all airborne debris away from the frame surrounding the front windshield. Quite often, a bug or rock traveling at high speed will penetrate the air current shield and impact the front windshield frame causing damage. Our invention does not address the protection of the windshield glass itself, but focuses on the paint finish and metal of the frame surrounding the front windshield of a motor vehicle. No inventor has developed an invention that is capable of specifically protecting the frame surrounding the front windshield of a motor vehicle as our invention does.

Our patent search of prior art has revealed the following comparable inventions:

U.S. Pat. No. 4,846,522 to Bonstead, Mastin, and Langren and assigned to Deflecta-Shield Corporation, 1989 discloses an extruded bug and gravel shield which is attached to the front hood of a motor vehicle. The shield is connected to the front portion of the hood of a vehicle and produces air currents while the vehicle is in motion which are meant to deflect bugs and gravel away from the front windshield area of the vehicle. This invention does well at protecting the front hood, but the air currents alone cannot change the path of a heavy rock or large insect propelled at high speed towards the front windshield area. Such a deflection device also creates air drag, reduces the aerodynamic efficiency of the vehicle, and can waste fuel.

U.S. Pat. No. 4,997,229 to Swanson 1991, discloses an apparatus for covering selected portions of a vehicle. This invention does not address its use as a cover for the frame surrounding the windshield of a motor vehicle. The invention comprises a plurality of cover sections for the front end of a motor vehicle. In fact, the use of this invention and the materials comprising this invention would not adequately protect the frame surrounding the front windshield due to the lack of stability of the materials used when formed in such thin sections as would be required to protect just the frame surrounding the front windshield. The inevitable result would be heavy "flapping" at highway speeds which in itself can cause paint wear. The material described in this patent is also not heavy and durable enough to absorb the impact of a larger object and denting may still occur.

U.S. Pat. No. 5,039,156 to Messmore and Chabet and assigned to Covercraft Industries, Inc., 1991 discloses an automobile hood shield with deflector. This invention combines the protective cover for the front end of a vehicle with a deflector device intended to divert debris away from the front windshield of a motor vehicle at highway speeds. This invention is again capable of protecting the front end of the vehicle, but the air deflection methods are far from adequate enough to thoroughly protect the windshield area.

As I have shown, no invention thus far has been designed to specifically protect the frame surrounding the front windshield of a motor vehicle as our invention does. The prior art which is most closely related to our invention relies on air currents for protection, whereas our invention is a cover that is meant to absorb the impact of debris, thereby protecting the frame surrounding the front windshield of a motor vehicle. Most other inventors have directed their protection devices towards protecting the windshield glass itself by the use of such air currents while the vehicle is in motion. This fact alone makes our invention unobvious to a person skilled in the art. The frame surrounding the front windshield of a motor vehicle has been overlooked by previous inventors as an area that requires protection from debris. The semi-rigid materials which comprises the main structure of our invention along with the attachment mechanisms and its specific purpose will clearly indicate the usefulness, novelty and unobviousness of our invention. In fact, all other comparable inventions suffer from a number of disadvantages:

a.) Other inventions do not cover the frame surrounding the front windshield of a motor vehicle.

b.) The use of air currents as a deflection means is not sufficient enough to adequately protect the windshield area from larger debris.

c.) Materials used for prior covers cannot absorb the impact of larger debris and may still result in the denting of the vehicle body.

d.) Air deflection devices are not aerodynamically efficient and can increase fuel consumption.

e.) Materials used on prior covers are not stable at highway speeds and tend to flap, causing paint wear.

f.) Other protective covers are difficult to install and remove.

OBJECTS AND ADVANTAGES

Accordingly, several objects and advantages of our invention, a protective cover for the frame surrounding the front windshield of a motor vehicle are as follows:

a.) The use of a highly durable semi-rigid material to absorb the impact of debris.

b.) Easy to install and remove.

c.) Specifically protects the frame surrounding the front windshield of a motor vehicle.

d.) May be applied as a decorative cover for an already damaged frame surrounding the front windshield of a motor vehicle.

e.) Aerodynamically efficient design.

f.) Protective cover is extremely stable at highway speeds.

g.) Totally covers the area requiring protection, instead of deflecting debris.

DRAWINGS AND FIGURES

DESCRIPTION OF INVENTION

Figure 1:
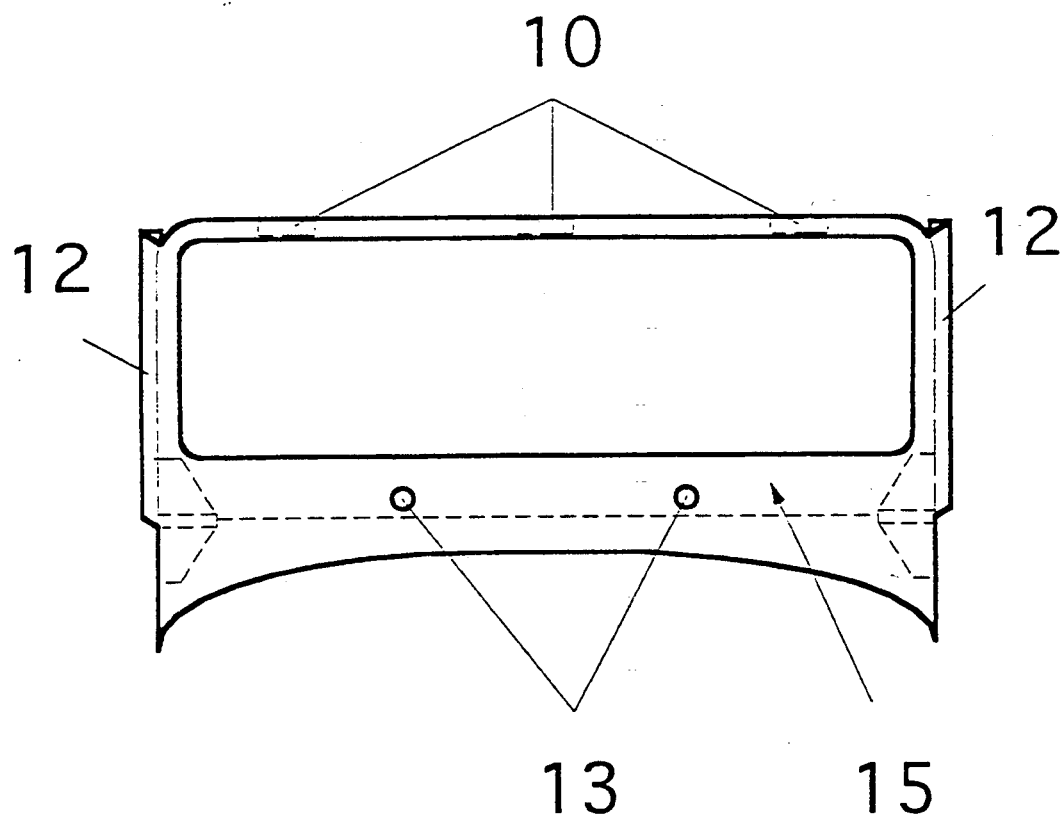
FIG. 1 shows a front view of our invention
- 10.) Hook and loop type fastening devices.
- 12.) Main attachment mechanisms.
- 13.) Wiper gear stem holes.
- 15.) Overall protective cover.

FIG. 1 shows a front view of our invention, a protective cover for the frame surrounding the front windshield of a motor vehicle. The overall protective cover (15) is comprised of a single piece of semi-rigid plastic material which is molded to the overall configuration of the frame surrounding the front windshield of a motor vehicle. The overall protective cover (15) overlays all exposed areas of the frame surrounding the front windshield, but does not in any way provide protection for the windshield glass itself. There exists a large opening in the overall protective cover (15) so that the driver's vision is totally unobstructed by the; overall protective cover (15) while driving. The dimensions of the overall protective cover (15) vary according to the amount of exposed frame surrounding the front windshield for the particular motor vehicle.

The upper portion of the overall protective cover (15) is secured by means of multiple hook and loop type fastening devices (10) placed intermittently across the inside of the upper portion of the overall protective cover (15) and firmly adheres the upper portion of the protective cover to the upper part of the motor vehicle windshield frame. Any other suitable attachment device may be substituted to secure the upper portion of the overall protective cover (15) such as, but not limited to, magnets, suction cups, snaps, or other attachment devices.

Figure 2:
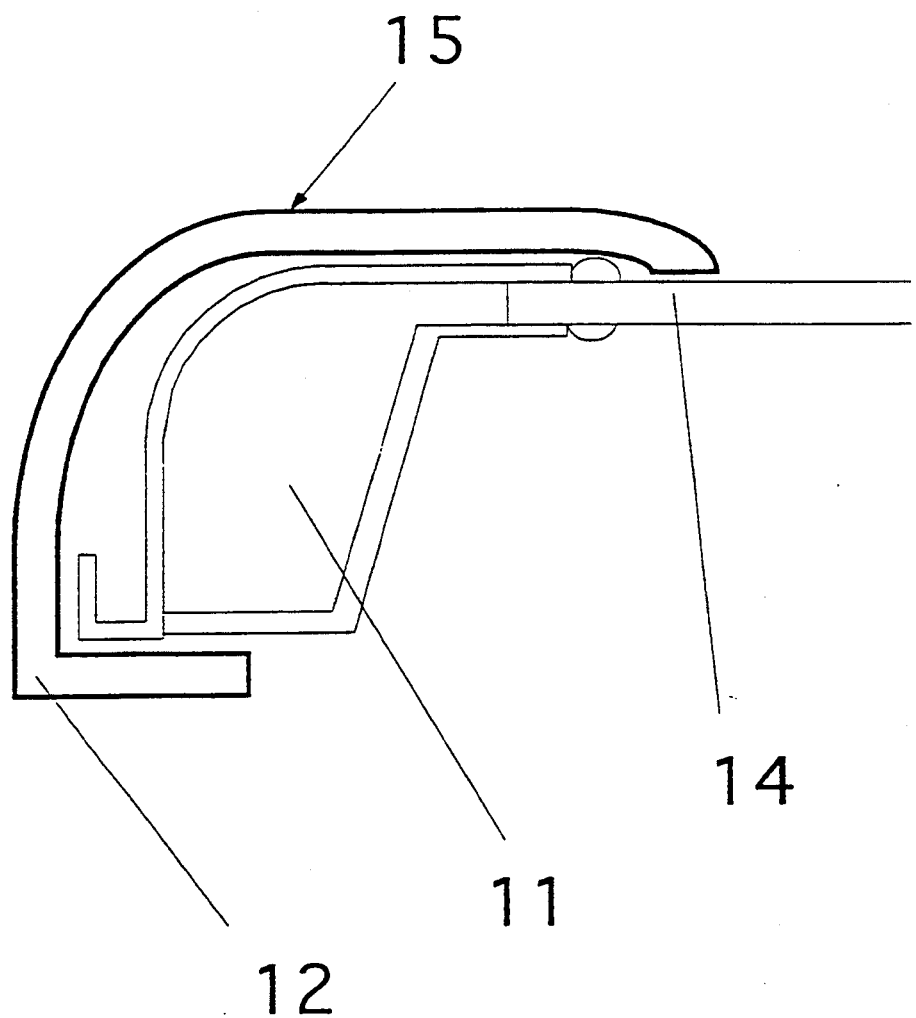
FIG. 2 shows an aerial cross section of the attachment mechanism as applied to a motor vehicle windshield frame
- 11.) Motor vehicle windshield frame.
- 12.) Main attachment mechanisms.
- 14.) Windshield glass.
- 15.) Overall protective cover.
Figure 3:
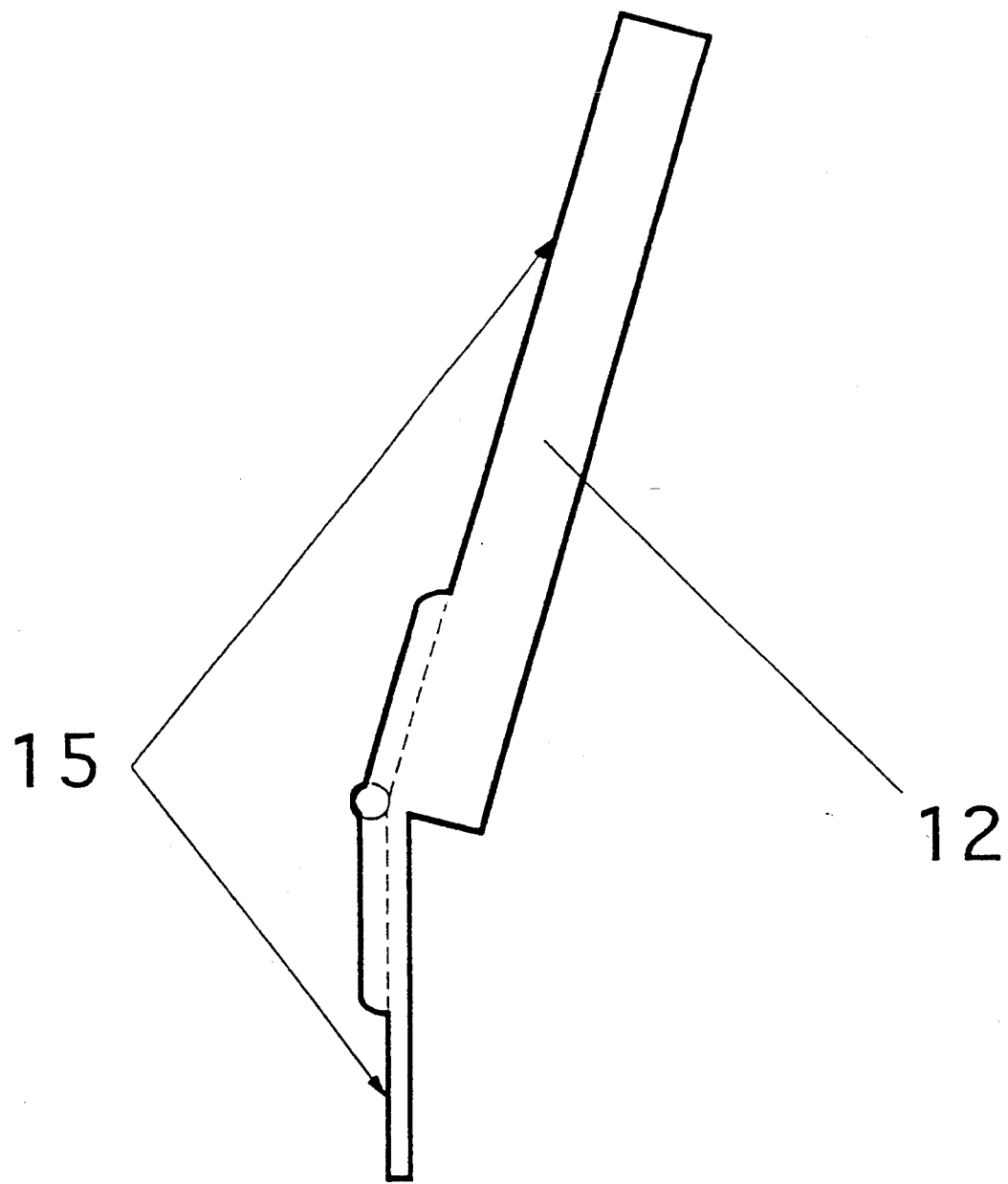
FIG. 3 shows a side view of our invention
- 12.) Main attachment mechanisms.
- 15.) Overall protective cover.
Figure 4:
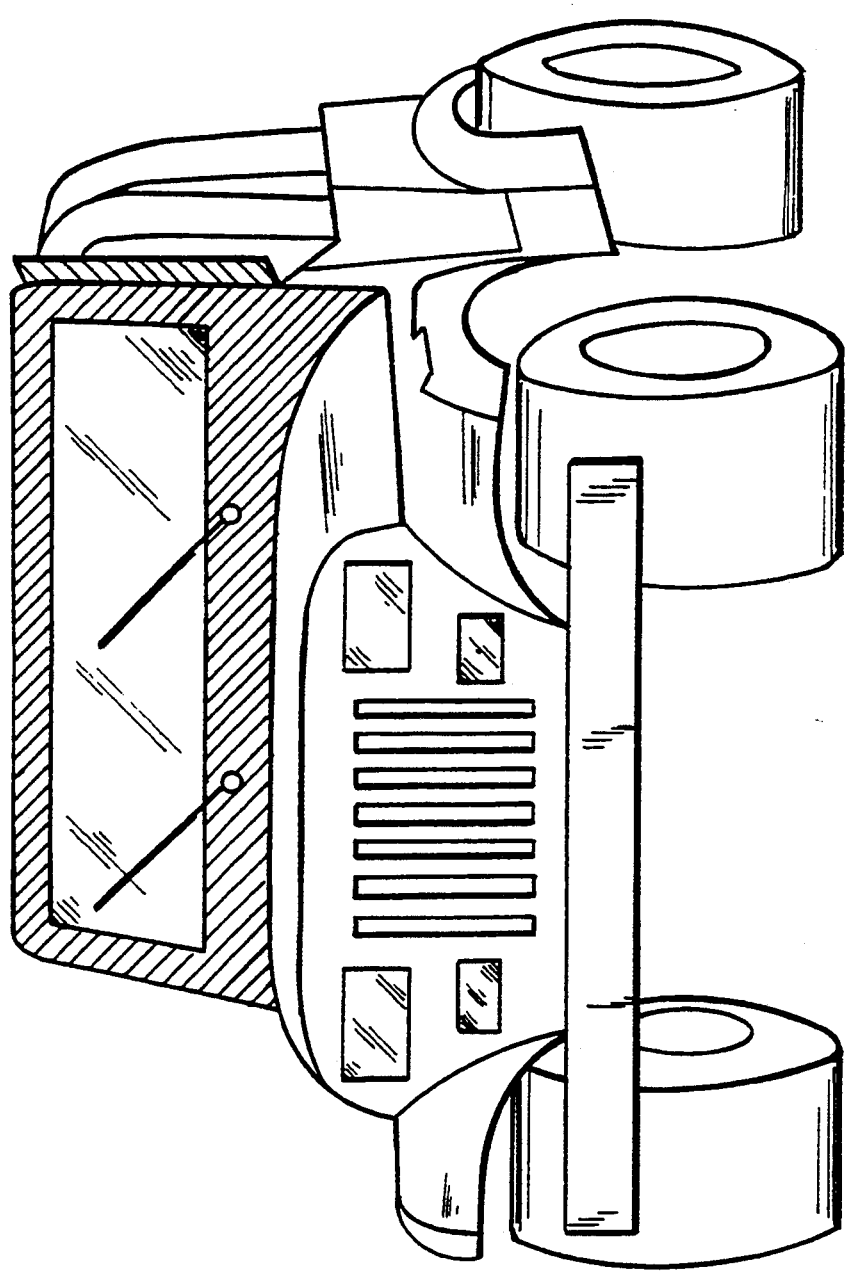
FIG. 4 shows a perspective view of our invention as it appears on a particular vehicle

FIG. 1 shows two main attachment mechanisms (12) which are located respectively at the right and left vertical portions of the overall protective cover (15). The attachment mechanisms (12) are continuous extensions of the same semi-rigid material which comprises the main structure of the overall protective cover (15). FIG. 2 shows an aerial cross-section view of the main attachment mechanisms (12) as it is applied to the windshield frame (11). The outer edge of each attachment mechanism (12) hooks around the back portion of the vertical windshield frame post on the motor vehicle, thereby creating sufficient force as to pull the overall protective cover (15) firmly against the windshield frame (11). Again, any other suitable attachment mechanisms may be substituted for the design mentioned above such as, but not limited to, clamps, hook and loop fasteners, nuts and bolts, screws, elastic straps, or other attachment mechanisms.

FIG. 1 shows the wiper gear holes (13). These wiper gear holes (13) are cut into the lower portion of the semi-rigid material so as to allow the gear stem of the windshield wiper motor to protrude and function in an unobstructed manner.

The overall shape of the protective cover is such that it conforms to the natural shape of the windshield frame for the particular vehicle. This shape includes, but is not limited to, the windshield frame hinges, molding trim, and curvature of the frame edges and vertical frame posts. The overall protective cover (15) and main attachment mechanisms (12) are constructed from a single unit of molded semi-rigid plastic material. Multiple sections of semi-rigid plastic material which are fastened together may also be used.

From the description above, a number of advantages of our protective cover for the frame surrounding the front windshield of a motor vehicle become evident:

a.) The protective cover protects the entire exposed frame surrounding the front windshield of a motor vehicle from damage caused by road debris.

b.) The protective cover is molded to retain the original shape and aesthetic qualities of the vehicle's windshield frame.

c.) The protective cover fits flush with the surface of the frame surrounding the front windshield, so as to retain the aerodynamic efficiency of the vehicle.

d.) The protective cover does not inhibit or interfere with the operation of the windshield wiper mechanism.

e.) The protective cover can be produced from a multitude of pigmented plastics of uniformed color density so as to provide the purchaser with a multitude of color choices for the specific vehicle.

f.) The semi-rigid material is capable of absorbing the impact of debris, thereby protecting the frame surrounding the front windshield.

g.) The protective cover uses a multitude of attachment mechanisms which are simple to apply and provide a highly secure fit at highway speeds.

h.) The protective cover is also a decorative attachment to the vehicle and will enhance the visual appearance of an already damaged front windshield frame.

OPERATION

The manner in which one uses the protective cover for the frame surrounding the front windshield of a motor vehicle is very simple. The windshield wiper arms are merely pulled of the wiper gear stem. The protective cover is simply placed over the front windshield frame, thereby covering all exposed areas of the paint and metal of the frame surrounding the front windshield. Vision through the windshield glass itself is not obstructed. The main attachment mechanisms (12) which are located on the left and right vertical frame posts respectively are applied around the backside of the right and left vertical frame posts of the motor vehicle. The upper portion of the protective cover is then secured to the upper edge of the windshield frame of the motor vehicle by the use of the hook and loop type fastening devices (10), or other suitable securement means. The wiper arms are then pressed back onto the wiper gear stems which protrude through the wiper gear stem holes (13) on the overall protective cover (15).

Since the protective cover is molded to the shape of the front windshield frame, and all of its contours and features, the protective cover lines up easily for an exact, quick installation.

SUMMARY: RAMIFICATIONS AND SCOPE

Accordingly, the reader will see that the protective cover for the frame surrounding the front windshield of a motor vehicle is easily installed or removed and provides excellent protection from damage caused by bugs, gravel, and various other types of road debris. Our invention will protect the metal and paint of the frame surrounding the front windshield of a motor vehicle from damage, thereby eliminating the expensive cost of repairing and repainting a damaged windshield frame. No other invention is specifically designed to protect this highly vulnerable area of a motor vehicle as our invention does.

While the description of our invention above contains many specificities, these should not be construed as limitations on the scope of the invention, but rather as an exemplification of one preferred embodiment thereof. Many other variations of design are possible, for example, the use of an attachment mechanism constructed of elastic material which attaches to the backside of the vertical frame posts and pulls the cover tightly against the frame surrounding the front windshield. Many other different types of main attachment mechanisms may be substituted such as, but not limited to, screws, nuts and bolts, hook and loop type fasteners, snaps, slide on clams, magnets, suction cups, straps, etc. Many other types of semi-rigid materials may also be used to construct the main body of the overall protective cover.

The protective cover may also be manufactured in a variety of colors or combination of colors as to please the individual purchaser of this product. The design and dimensions of the protective cover can also be varied according to the design of the frame surrounding the front windshield of different types of motor vehicles. The company name and logo may also be placed on the outside of the protective cover. The cover may be constructed out of multiple sections of semi-rigid material which are fastened together or as a single unit as identified in our description of invention.

We claim:

1. A protective cover for a vehicular windshield frame which surrounds a windshield and has a first upstanding frame post positioned at a first side portion of the windshield, a second upstanding frame post positioned at a second side portion of the windshield, a windshield-frame top portion extending between the first and second upstanding frame posts, and a windshield-frame bottom portion extending between the first and second upstanding frame posts, the vehicular windshield frame for supporting the windshield in an upstanding position, said protective cover comprising:

an upper, transversely-extending panel positioned to cover the windshield-frame top portion;

a lower, transversely-extending panel positioned to cover the windshield-frame bottom portion which extends between the upstanding frame posts of the windshield frame;

a first, longitudinally-extending panel positioned to cover the first upstanding frame post and connected to a first end portion of the upper, transversely-extending panel and to a first end portion of the lower, transversely-extending panel;

a second, longitudinally-extending panel positioned to cover the second upstanding frame post and connected to a second end portion of the upper, transversely-extending panel and to a second end portion of the lower, transversely-extending panel;

a first hooked extension formed to extend beyond the first, longitudinally-extending panel along substantially the length of said first longitudinally-extending panel, said first hooked extension positionable about a rear portion of the first upstanding frame post to generate a first attaching force, when positioned about the rear portion of the first upstanding frame post, to maintain the first, longitudinally-extending panel in position to cover the first, upstanding frame post; and a second hooked extension formed to extend beyond the second, longitudinally-extending panel along substantially the length of said second longitudinally-extending panel, said second hooked extension positionable about a rear portion of the second upstanding frame post to generate a second attaching force, when positioned about the rear portion of the second upstanding frame post, to maintain the second, longitudinally-extending panel in position to cover the second upstanding frame post.

2. The protective cover of claim 1 wherein said upper, transversely-extending panel, said lower, transversely-extending panel, said first, longitudinally-extending panel, said second, longitudinally-extending panel, said first hooked extension, and said second hooked extension are all integrally formed of a semi-rigid plastic material.

3. The protective cover of claim 2 wherein said semi-rigid plastic material comprises a colored pigmented plastic material.

4. The protective cover of claim 1 further comprising spaced-apart fastening devices positioned along the upper, transversely-extending panel for fastening the upper, transversely-extending panel to the windshield-frame top portion.

5. The protective cover of claim 4 wherein said spaced-apart fastening devices comprise hook and loop-type fastening devices.

6. The protective cover of claim 4 wherein said spaced-apart fastening devices comprise magnetic-type fastening devices.

7. The protective cover of claim 4 wherein said spaced-apart fastening devices comprise suction-type fastening devices.

8. The protective cover of claim 4 wherein said spaced-apart fastening devices comprise snap-type fastening devices.

9. In a motorized vehicle having a front hood assembly, a vehicular windshield frame extending above the front hood assembly and surrounding a windshield, the vehicular windshield frame having a first upstanding frame post positioned at a first side portion of the windshield, a second upstanding frame post positioned at a second side portion of the windshield, a windshield-frame top portion extending between the first and second upstanding frame posts, and a windshield-frame bottom portion extending between the first and second upstanding frame posts, and a windshield wiper assembly having a first windshield wiper wiper gear stem and a second windshield gear stem spaced-apart from the first windshield wiper gear stem wherein the first windshield wiper gear stem and the second windshield wiper gear stem are positioned proximate to the windshield-frame bottom portion, a combination with the vehicular windshield frame of a protective cover, said protective cover comprising:

an upper, transversely-extending panel positioned to cover the windshield-frame top portion;

a lower, transversely-extending panel positioned to cover the windshield-frame bottom portion, the lower, traversely-extending panel having apertures extending therethrough which are spaced-apart by distances corresponding to distances separating the first windshield wiper gear stem and the second windshield wiper gear stem to permit thereby extension of the first windshield wiper gear stem and the second windshield wiper gear stem through the apertures;

a first, longitudinally-extending panel positioned to cover the first upstanding frame post and connected to a first end portion of the upper, transversely-extending panel and to a first end portion of the lower, transversely-extending panel;

a second, longitudinally-extending panel positioned to cover the second upstanding frame post and connected to a second end portion of the upper, transversely-extending panel and to a second end portion of the lower, transversely-extending panel;

a first hooked extension formed to extend beyond the first, longitudinally-extending panel along substantially the length of said first longidutinally-extending panel, said first hooked extension positionable about a rear portion of the first upstanding frame post to generate a first attaching force, when positioned about the rear portion of the first upstanding frame post, to maintain the first, longitudinally-extending panel in position to cover the first, upstanding frame post; and a second hooked extension formed to extend beyond the second, longitudinally-extending panel along substantially the length of said second longitudinally-extending panel, said second hooked extension positionable about a rear portion of the second upstanding frame post to generate a second attaching force, when positioned about the rear portion of the second upstanding frame post, to maintain the second, longitudinally-extending panel in position to cover the second upstanding frame post.

10. The combination of claim 9 wherein the front hood assembly further comprises a generally convex-shaped top face surface to permit seating of the lower, transversely-extending panel upon the top face surface of the front hood assembly.

11. The combination of claim 9 further comprising spaced-apart fastening devices positioned along the upper, transversely-extending panel for fastening the upper, transversely-extending panel to the windshield-frame top portion.

12. A method for protectively covering a vehicular windshield frame which surrounds a windshield and has a first upstanding frame post positioned at a first side portion of the windshield, a second upstanding frame post positioned at a second side portion of the windshield, a windshield-frame top portion extending between the first and second upstanding frame posts, and a windshield-frame bottom portion extending between the first and second upstanding frame posts, the vehicular windshield frame for supporting the windshield in an upstanding position, said method comprising the steps of:

positioning an upper, transversely-extending panel to cover the windshield-frame top portion;

positioning a lower, transversely-extending panel to cover the windshield-frame bottom portion which extends between the upstanding frame posts of the windshield frame;

positioning a first, longitudinally-extending panel to cover the first upstanding frame post;

positioning a second, longitudinally-extending panel to cover the second upstanding frame post;

positioning a first hooked extension formed to extend beyond the first, longitudinally-extending panel along substantially the length of said first longitudinally-extending panel, about a rear portion of the first upstanding frame post to generate a first attaching force, when positioned about the rear portion of the first upstanding frame post, to maintain the first, longitudinally-extending panel in position to cover the first, upstanding frame post; and positioning a second hooked extension formed to extend beyond the second, longitudinally-extending panel along substantially the length of said second longitudinally-extending panel about a rear portion of the second upstanding frame post to generate a second attaching force, when positioned about the rear portion of the second upstanding frame post, to maintain the second, longitudinally-extending panel in position to cover the second upstanding frame post.

* * * * *